United States Patent

Glos, II

[15] 3,643,803

[45] Feb. 22, 1972

[54] SECTION FOR DISC FILTER APPARATUS

[72] Inventor: Edward A. Glos, II, Deerfield, Ill.

[73] Assignees: Gladys M. Glos; Thomas C. Nathan; Jack W. La Follette, , part interest to each

[22] Filed: Jan. 19, 1970

[21] Appl. No.: 3,851

Related U.S. Application Data

[63] Continuation-in-part of Ser. No. 598,077, Nov. 30, 1966, Pat. No. 3,491,886.

[52] U.S. Cl. ............................. 210/232, 210/331, 210/347, 210/486
[51] Int. Cl. ........................................................ B01d 33/26
[58] Field of Search ................. 210/232, 486, 461, 331, 498, 210/333, 345, 344, 347

[56] References Cited

UNITED STATES PATENTS

| | | | |
|---|---|---|---|
| 1,735,007 | 11/1929 | Lanes | 210/486 |
| 2,104,473 | 1/1938 | Watson | 210/486 |
| 2,964,194 | 12/1960 | Oliver, Jr. et al. | 210/486 |
| 3,491,886 | 1/1970 | Glos et al. | 210/486 |

FOREIGN PATENTS OR APPLICATIONS 1,110,150  10/1955  France..................................210/498

Primary Examiner—Frank A. Spear, Jr.
Attorney—Martin Faier

[57] ABSTRACT

A polygonal section for filter apparatus in which each section consists of a hollow open-faced frame connected to a vacuum source with a perforated panel overlying each open face, and a stretcher element for holding filter media taut over the panel, accessible from one margin of the frame, and which may be removed from the section and apparatus independently of the frame and panel.

12 Claims, 17 Drawing Figures

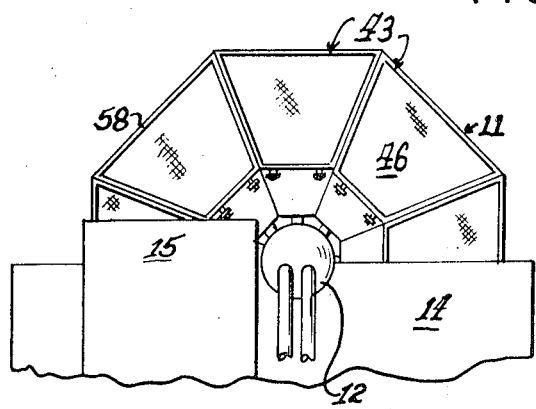
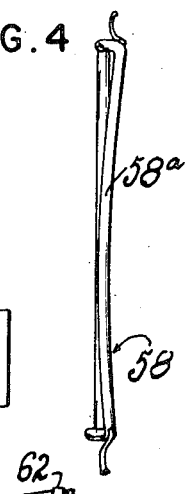
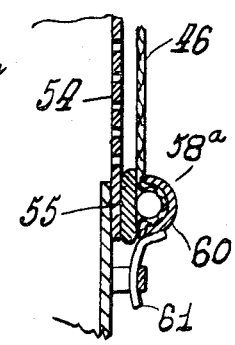
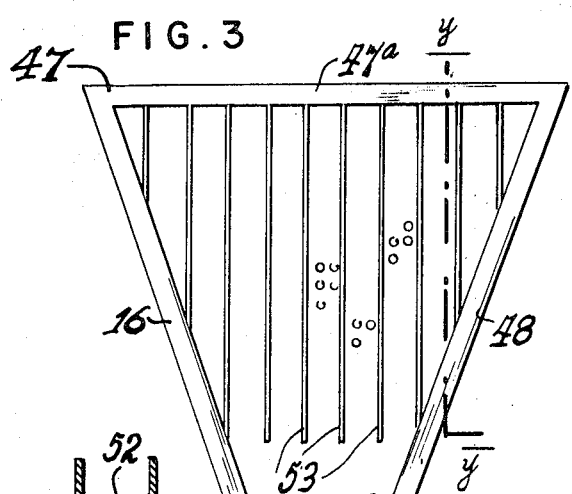
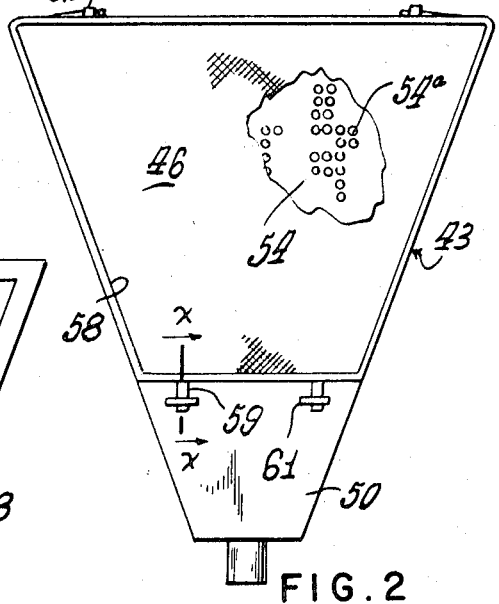
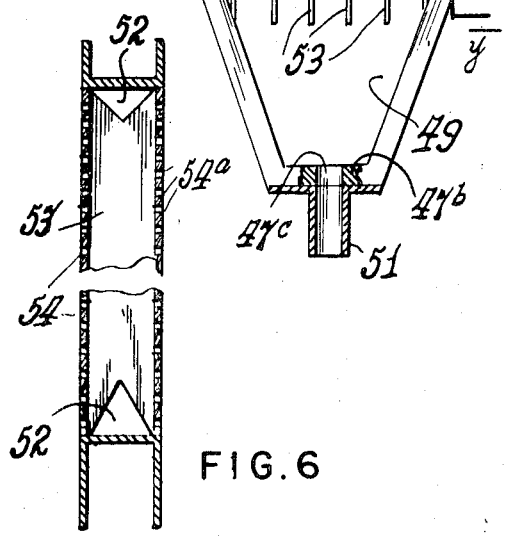
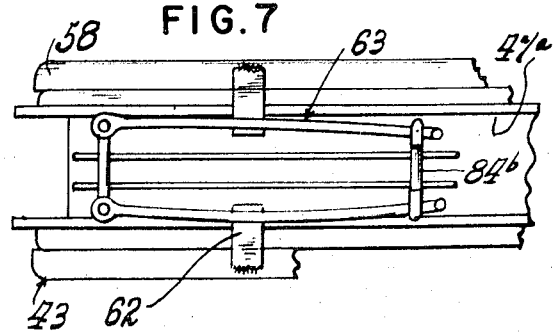

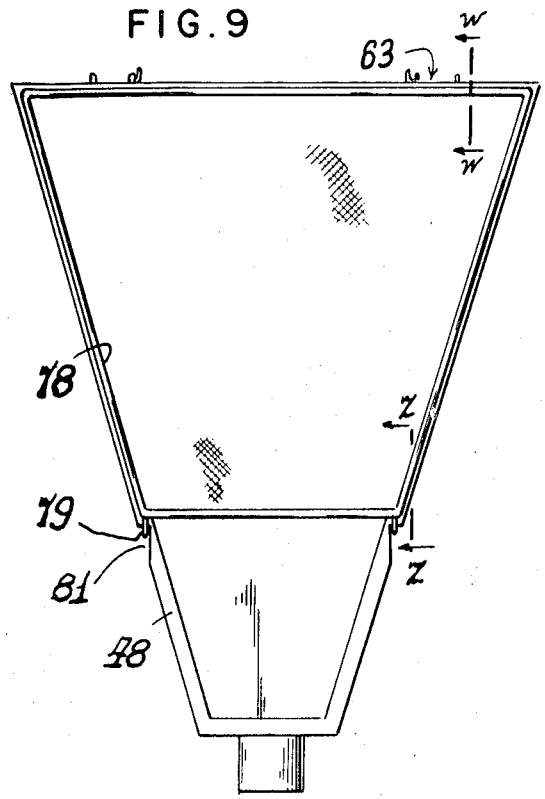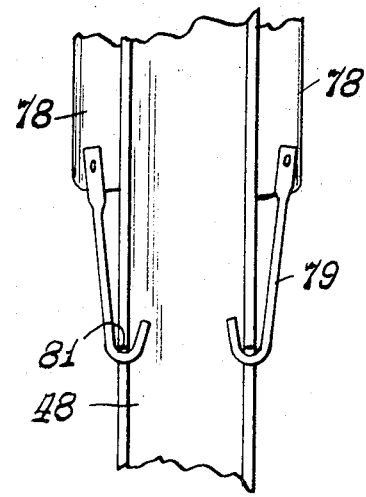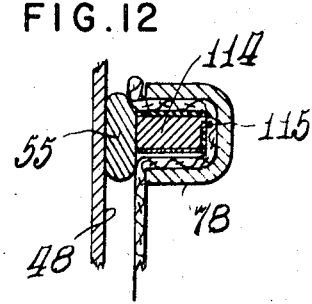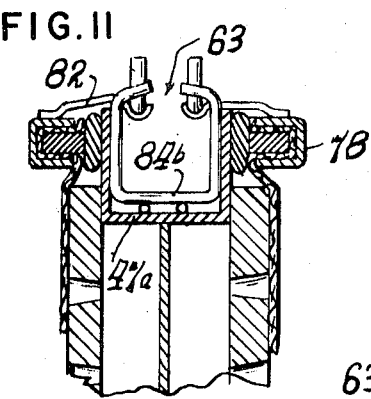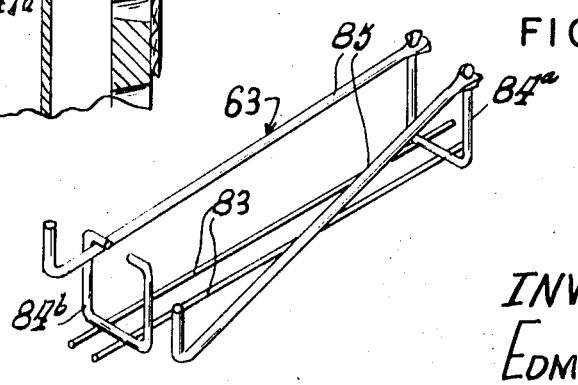

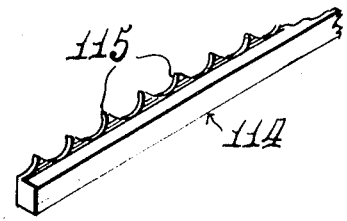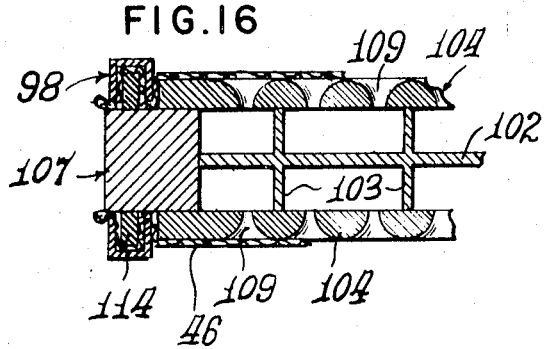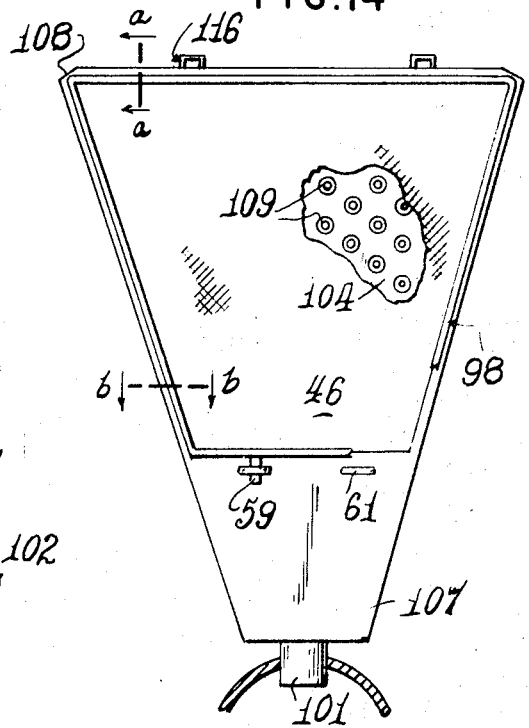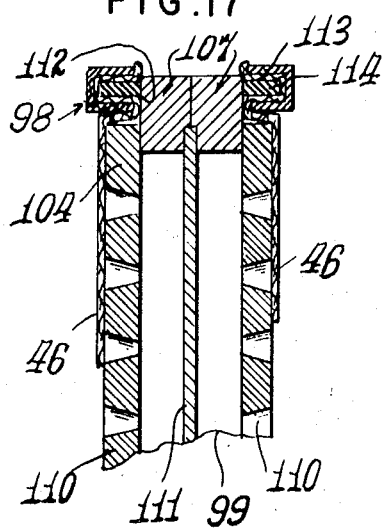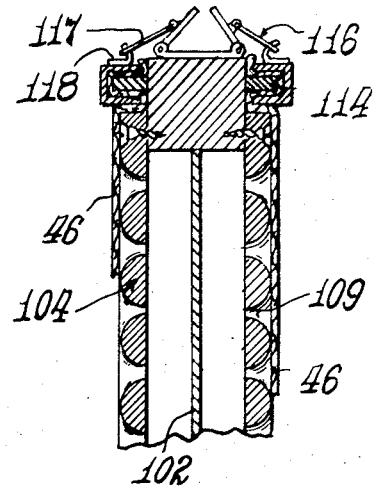

SECTION FOR DISC FILTER APPARATUS

This application is a continuation in part of copending application Ser. No. 598,077, filed Nov. 30, 1966, for a SECTOR FOR DISC FILTER APPARATUS, now U.S. Pat. No. 3,491,886, issued Jan. 27, 1970.

The invention relates to improvements in filter apparatus and is more particularly related to the novel construction and assembly of a section for a disc filter.

Industries, such as mining mills, employ banks of filter discs, each comprised of a plurality of filter sections, having media thereon that is removable for replacement, which may comprise a filter bag encircling the section or a laminated panel of media bonded to an underlying perforated board. The media must be retained taut over the section, and filtrate must enter the filter only through the media. The sections are in flow communication with a central hollow shaft, and the discs are rotated slowly through a slurry tank, as to immerse a portion thereof in the slurry being filtered at all times. Negative pressure in the shaft draws filtrate through the immersed sections, which accumulate a cake on the media. At preselected intervals, usually where the section reenter the tank, air is applied on the section interior to cause the cake to fall off the media and discharge into a collector.

The filter media, and the panels and frame comprising the sections, have different and varying wear characteristics. For example, media is often replaced every 7-90 days, panels often last 6 months to 2 years, and usually the frames have a much longer useful life, all depending upon the content of the slurry, the filtrate, vacuum pressure, type of media, and other variables. Conventionally, each time the media requires changing, the entire filter section (usually about 2½ ft. × 2 ft. in dimensions, weighing about 25 lbs, without filter cake, and generally coated with muck accumulated from its passes through the slurry) must be removed from the central shaft or core (and there are generally eight discs on the core spaced about 14-18 inches apart, and usually each disc comprises 10 sections or sectors, or a total of 80 sections per filter assembly); and in order to accomplish the change-out, the operator must detach the section from the other sections of the disc and the vacuum system, lift the heavy section and its old, messy and heavy media from the slurry tank, remove the old media from the section, install new media, and then reinstall the sector and system.

Even with conventional media laminated panel systems, the panels and media must be removed together, and this too requires partial disassembly and reassembly of the system. Conventionally, there are also problems of discarding panels having remaining useful life when only the media requires changing or discarding frames having remaining useful life when only the panels require changing. At best conventional devices and systems and procedures are time-consuming, inefficient, expensive, messy, and just plain hard work.

These disadvantages may be overcome by providing a relatively lightweight and easy to handle stretcher element and mounting members therefor for securing the media to the section and an underlying panel and frame structure constructed so that media may be replaced by removal of the stretcher element and media only without affecting or removal of the underlying panel and frame structure, panels may be replaced without discarding the frame, and filtration characteristics of the entire assembly are improved by use of novel antiturbulent and reinforcing partitions and ribs within the frame and tapered ports and related structure in the panels.

It is therefore an object of the invention to provide novel filtering apparatus.

Further objects of the invention are to provide novel means for securing and changing filter media on a filter section, and to provide novel means to reduce turbulence of filtrate flowing through a filter assembly.

Still another object is to provide a filter unit embodying novel features of construction, and one that is efficient in use and not expensive to manufacture or maintain in a serviceable condition.

The structure by means of which the above and other advantages and objects of the invention are attained will be described in the following specification, taken in conjunction with the accompanying drawings, showing preferred illustrative embodiments of the invention.

In the drawings:

FIG. 1 is an end view of a section of a rotary disc filter, showing a filter disc comprised of the improved filter sections.

FIG. 2 is a front elevational view of one of the filter sections shown in FIG. 1, with the media partially broken away to show the underlying panel.

FIG. 3 is a view of the section with the top panel removed, showing the interior thereof.

FIG. 4 is a side elevational view of a bowed stretcher element.

FIG. 5 is a detail sectional view of the stretcher element and frame assembly, taken on line $x-x$ of FIG. 2.

FIG. 6 is a detail sectional view of the section, taken on line $y-y$ of FIG. 3, including the top panel.

FIG. 7 is an enlarged end view showing a stretcher element locking device.

FIG. 8 is a perspective view of the stretcher element locking device.

FIG. 9 is a front elevational view illustrating a modified filter section.

FIG. 10 is a detail sectional view taken substantially on line $z-z$ of FIG. 9.

FIG. 11 is a detail sectional view taken substantially on line $w-w$ of FIG. 9.

FIG. 12 is a sectional view of part of the stretcher element assembly, showing a caulking blade for holding the filter media.

FIG. 13 is a perspective view of the caulking blade.

FIG. 14 is a front elevational view of another modified filter section.

FIG. 15 is a detail sectional view taken substantially on line $a-a$ of FIG. 14.

FIG. 16 is a detail sectional view taken substantially on line $b-b$ of FIG. 14.

FIG. 17 is a detail sectional view of part of another modified section, similar to FIG. 16, except showing a filter section molded from plastic materials.

The representative filter apparatus shown in FIG. 1 comprises a series of spaced apart filter discs 11 (one shown) mounted for rotation about or with a hollow shaft or core 12. The filter disc is made up of a plurality of like filter sections 43 embodying the features of the invention. In operation, the filter discs 11 are slowly rotated so as to continuously immerse their lower sections in a body of slurry contained in tank 14. During rotation of the filter discs 11, and just prior to section reentry into the slurry, air is admitted into the interior of such section to blow filter cake off of the filter section, and the cake falls into discharge areas 15 provided in the tank.

The filter sections 43 each comprise a substantially trapezoidal frame 16, including end walls 47 and inclined sidewalls 48. The frame defines an open faced chamber 49 having facing walls 50 adjacent the end of lesser width, and said end carries a duct or conduit 51 which is connected in flow communication with hollow shaft 12.

The open faces of the chamber 49 are closed by filter panels 54; and laid over the outside face of each panel is filter media 46, which may consist of any suitable woven or intercised fabric, and which must be held taut over the face of the filter panel. To this end stretcher element 58 is provided, which also functions to mount the media and to prevent leakage of filtrate into the perforations on the panel without first passing through the filter media. The stretcher element is tension secured to the section by hook assemblies 62-63, which lie within the largest perimeter of the disc assembly, consequently affording no obstruction to disc rotation and at a point where wear and accumulation of muck thereon is minimized.

Referring now to FIGS. 1 through 7, each filter section 43 comprises a pair of end channels, 47a and b, secured to inclined side channels 48, defining open faced chamber 49, having walls 50 adjacent channel 47b. This channel 47b is centrally apertured, at 47c, and tubing 51 is welded to the channel to form a conduit in flow communication with chamber 49 and for attachment to the source of vacuum pressure. Within chamber 49 are spaced-apart ribs 53 mounted in the direction of vacuum pressure. Ribs adjacent inclined channels 48 have V cutouts 52 to permit flow of filtrate. Perforated panels 54 are secured, as by welding, to channels 47a and 48 and walls 50, to seal the chamber from leakage and entry of filtrate except through perforations 54a.

A sponge rubber gasket 55 is cemented about the periphery of panel 54. Stretcher element 58, formed by channel 58a, normally bowed, holds filter media 46 tautly by resilient strip 60 nested within channel 58a. When the media carrying stretcher element 58 is secured onto the section, by sliding tabs 59 under brackets 61 mounted on walls 50, the element is spring flexed against the section and hooks 62 are locked by securing mechanism 63, welded to channel 47a, with the element bearing against and compressing the gasket to seal it.

In the FIGS. 9–11 modification, side channels 48 have notches 81, and the stretcher element 78 has a pair of cleats adaptable to fit into the notches. Once the cleats are hooked into the notches, the stretcher element is locked into place by securing its hooks 82 into securing mechanism 63. This securing mechanism (shown in FIG. 8) consists of a pair of rails 83 and spaced-apart uprights 84a and 84b welded to the rails. U-shaped upright 84a carries at the end of each leg thereof a freely swingable latch 85, and C-shaped upright 84b acts as a locking member for each latch. The rails 83 are firmly secured to the channel 47a, as by welding.

The filter section 98 illustrated in FIGS. 14 through 16 comprises framing members 107, preferably of wood, having a tubular neck 101 for attachment to the vacuum core, and a pair of filter panels 104 overlying and secured to the framing members, to define and interior chamber 99 therein. Each panel 104 is preferably molded from high-strength plastic, such as fiber glass, or fabricated from hardboard, and has a central divider partition 102 and vanes 103 underlying and reinforcing the panels. The partition and vanes may be coated with latex or plastic material to resist abrasion, as at 105.

The perforations or ports 109 in the panels are formed during molding or by reaming, and are tapered or radial to permit mold or reamer release during formation, and, more importantly, to act as a funnel in admitting filtrate into the chamber 99, in a sort of venturi effect. These ports may be staggered to increase the area for filtrate entry. The outside corners 108 of the framing members 107 and panels 104 may be chamfered to allow seating of a connector member (not shown) between sections joined to one another.

As illustrated in FIG. 17, framing members 107 may be molded, preferably from fiberglass, to form a unitary structure with their related filter panels 104. Preferably, these unitary framing members 107—filter panels 104 are molded into mating halves 110, with each half being notched to accommodate a central partition 111 and seat 112 for the stretcher element.

This stretcher element 98 preferably comprises a channel 113 and the media is secured thereto by means of a caulking blade 114 (shown in FIGS. 12 and 13) nested in the channel over the media. The caulking blade 114 is scalloped with spaced-apart teeth 115 for holding the media. A luggage-type snap lock 116, having a pivotable arm 117 and link for detachable connection with a hook 118 welded to the stretcher element may be mounted on the framing members for locking the stretcher element in place.

It should be evident that when a filter media, having a relatively short useful life, must be changed or replaced, the means for locking the stretcher element is disengaged from the filter section, without removal of the panels or sections from the vacuum source, and the stretcher element and used media is withdrawn from the filtering apparatus, as to not disturb adjacent sections or discs. The media is then replaced on the stretcher element and the stretcher element with the media thereon is reinserted into the filter apparatus.

When replacement of the filter panels of the type having removable panel members, as shown in FIGS. 14–16, is required, the entire sections are removed from the vacuum source, and the panels are replaced. The panels and framing members shown in the other figures are not generally replaceable, and the entire sections are discarded when the panels become abraded.

In operation, slurry is drawn onto and through the filter section while it is immersed in the slurry. The filtrate passes through the filter media and filter panel perforations and is discharged through the hollow shaft or core toward the vacuum source. Filter cake accumulating on the surface of the filter media is discharged into discharge areas and carried away from the apparatus by suitable conveyance means, when rotation of the disc carries a caked filter media into a predetermined position, at which point pressurized air is admitted into the unit, as through the hollow shaft or core in communication with the duct or tube, in a manner well known in this art.

Although preferred embodiments of this invention have been described in detail, it will be understood that the description thereof is intended to be illustrative only, rather than restrictive, as many details of the structure may be modified or changed without departing from the spirit or scope of the invention, and, accordingly, it is not desired to be restricted to the exact construction described.

I claim:

1. In a filter assembly having spaced-apart filter members mounted for rotation about a core and in which each filter member includes a plurality of filter sections, each section being subjected to internal vacuum pressure and having a peripheral portion accessible from an edge thereof, each said filter section comprising a hollow body open on at least one face in flow communication with a source of pressure; an apertured filter panel overlying each open face; filter media overlying each filter panel; and securing means for holding the media over the panel and including a member removably secured to the body for mounting the filter media over the filter panel, said removable member having a frame independent of the body and panel and a yieldable element for securing the media to the frame.

2. The filter section recited in claim 1, in which the frame comprises a channel and the yieldable element nests within the channel.

3. The filter section recited in claim 2, in which the frame includes means for detachably locking the frame onto the body.

4. The filter section recited in claim 3, in which the locking means comprises tabs on the frame and latching means on the body.

5. The filter section recited in claim 2, in which the frame is bowed when in removed condition and flexed under tension when secured over the panel.

6. The filter section recited in claim 1, in which the body contains ribs some of the ribs are shorter than other ribs, and the shorter ribs are notched to permit flow of filtrate toward the pressure source.

7. The filter section recited in claim 1, in which the filter panel apertures are circular and have a tapered cross section to provide ports of lesser diameter opening into the body.

8. The filter section recited in claim 1, in which the body is notched and the removable member includes cleats for detachably nesting in the notches.

9. In a filter media assembly for a disc filter having an accessible margin, said assembly comprising a stretcher frame adaptable for securing filter media to the filter and yieldable means for retaining media to the frame prior to securing the frame to and independent of the filter, said assembly including means for installing the frame on and withdrawing the frame from the filter from said accessible margin.

10. The filter media assembly recited in claim 9, in which said retaining means comprises a sawtoothed blade bearing against the filter media.

11. The filter media assembly recited in claim 9, in which the frame comprises a channel and the retaining means comprises a strip of yieldable material adaptable to nest within the channel and hold the media in place.

12. In a method for installing filter media over the filter area of a rotary disc filter section having an accessible margin on its periphery without removing the section from the filter, comprising the steps of yieldably securing media of a size adaptable to cover said area onto a frame, placing the frame over the filter section, and locking the frame at said margin under tension against said section to seal the area against passage of filtrate except through the media.

* * * * *